United States Patent [19]

Hiraga et al.

[11] 4,154,805

[45] May 15, 1979

[54] PHOSPHORIC ACID PURIFICATION

[75] Inventors: Yoichi Hiraga; Mitsuo Kikuchi, both of Shin-nanyo, Japan

[73] Assignee: Toyo Soda Manufacturing Co., Ltd., Yamaguchi, Japan

[21] Appl. No.: 842,251

[22] Filed: Oct. 14, 1977

[30] Foreign Application Priority Data

Oct. 29, 1976 [JP] Japan ................. 51-129329

[51] Int. Cl.$^2$ ............................................ C01B 25/16
[52] U.S. Cl. ................................................ 423/321 S
[58] Field of Search ................. 423/321 S, 321 R, 100

[56] References Cited

U.S. PATENT DOCUMENTS

| | | | |
|---|---|---|---|
| 3,297,401 | 1/1967 | Sakomura et al. | 423/321 R |
| 3,488,184 | 1/1970 | Hesler | 423/100 |
| 3,920,797 | 11/1975 | Toshimitsu et al. | 423/321 S |

*Primary Examiner*—O. R. Vertiz
*Assistant Examiner*—Thomas W. Roy

*Attorney, Agent, or Firm*—Oblon, Fisher, Spivak, McClelland & Maier

[57] ABSTRACT

Wet process phosphoric acid prepared by treating phosphate rock with sulfuric acid and separating calcium sulfate, is purified to obtain a purified phosphoric acid by (a) an acid extracting section contacting the wet process phosphoric acid and a phosphoric acid solution containing impurities obtained in the scrubbing section with an organic solvent in the presence of the hydrochloric acid required for extracting a substantial amount of the phosphoric acid component; (b) a scrubbing section contacting the extract obtained in the acid extracting section with aqueous phosphoric acid or water while maintaining the chloride ion concentration in the aqueous phase in the range of 20 to 40 g/liter as Cl; (c) an acid stripping section contacting the purified extract obtained in the scrubbing section with water and (d) an adsorbing section contacting the extracted phosphoric acid obtained in the acid stripping section with an anion-exchange resin.

4 Claims, No Drawings

PHOSPHORIC ACID PURIFICATION

BACKGROUND OF THE INVENTION

1. Field of the Invention

The present invention relates to a process for purifying wet process phosphoric acid. More particularly, it relates to a process for producing phosphoric acid having high purity which is suitable for industrial uses and food additive uses etc.

2. Description of the Prior Art

The wet process phosphoric acid prepared by treating phosphate rock with sulfuric acid and separating calcium sulfate usually contains impurities such as iron, aluminum, sodium, calcium, magnesium titanium, sulfuric acid, hydrofluoric acid and silica which are derived from the raw materials, phosphate rock and sulfuric acid. Recently, wet process phosphoric acid has been used not only for the preparation of fertilizer but also for industrial uses and food additive uses after separating the impurities.

Various processes for purifying the wet process phosphoric acid have been proposed. The solvent extraction process has been the process in practice used. In the solvent extraction process, phosphoric acid is extracted from the wet process phosphoric acid with organic solvents such as alcohols e.g. n-butyl alcohol, iso-butyl alcohol, isoamyl alcohol, cyclohexanol; ketones e.g. methyl ethyl ketone, methyl isobutyl ketone; ethers e.g. isopropyl ether and phosphoric acid esters e.g. tributyl phosphate, etc. and then, phosphoric acid is back-extracted with water.

In these processes, the impurities in the wet process phosphoric acid are usually in the form of phosphates. The phosphates are not usually extracted by the organic solvent and are easily precipitated as the phosphates depending upon the decrease of the phosphoric acid concentration whereby the scaling is caused in extractor. Accordingly the phosphoric acid extraction efficiency is limited by these circumstances. Thus, 50 to 70 wt.% has been the maximum phosphoric acid extraction efficiency. Accordingly, $P_2O_5$ in the residual aqueous solution in the solvent extracting process has to be used as fertilizer or the raw material for producing salts where high purity is not required.

Various processes for improving phosphoric acid extraction efficiency have been proposed. In the practically used process, hydrochloric acid is included in the extraction system. In the process, the phosphoric acid extraction efficiency is relatively improved whereas the purification efficiency in removing certain impurities is decreased depending upon the increase of hydrochloric acid in the extraction system. When excess hydrochloric acid is included in the extraction system, the zinc component in the wet process phosphoric acid is extracted along with the phosphoric acid into the organic solvent phase, and accordingly, zinc contaminates the purified phosphoric acid. It has been proposed to discharge a part of the zinc-containing solution from the extraction system while maintaining the concentration of hydrochloric acid in the extraction system lower than a certain level in order to prevent contamination with zinc (Japanese Unexamined Patent Publication No. 17399/1974). In this process, the operating sections and the control of the operation are complicated and the concentration of hydrochloric acid in the acid extracting section has to be lowered whereby satisfactory phosphoric acid extraction efficiency cannot be attained.

Recently, from the viewpoint of the increased cost of phosphate rock and the need to treat the waste solution containing phosphoric acid or phosphate to control pollution, it is necessary to improve the phosphoric acid extraction effeciency. Thus, the phosphoric acid extraction efficiencies of about 95% are not satisfactory and substantial amounts of phosphoric acid should be extracted.

The residual aqueous solution in the solvent extraction process contains most of the impurities included in the wet process phosphoric acid and has a remarkably low concentration of phosphoric acid. Therefore, it is difficult to use the residual aqueous solution for the preparation of fertilizer and the phosphoric acid is usually lost.

From the viewpoint of control of environmental pollution caused by phosphoric acid, the residual aqueous solution cannot be directly discharged. Accordingly, it is necessary to recover the phosphoric acid component from the residual aqueous solution or to solidify the phosphoric acid component as insoluble apatite. The decrease of phosphoric acid extraction efficiency causes the increase of costs caused by the loss of phosphoric acid remaining in the residual aqueous solution and the treatment of the residual aqueous solution.

The inventors have researched a process for producing purified phosphoric acid containing no zinc by extracting and purifying the wet process phosphoric acid in the presence of enough hydrochloric acid to extract a substantial amount of the phosphoric acid from the wet process phosphoric acid. As a result, the inventors have found that purified phosphoric acid containing no zinc can be obtained by contacting phosphoric acid containing zinc which is obtained by the solvent extraction process in the presence of hydrochloric acid with an anion-exchange resin.

As is well-known, when excess chloride ions are present, zinc forms chloro-complex ions which are adsorbed on the anion-exchange resin. It has been believed that more than 35 g/liter preferably 70 g/liter as Cl is required, in order to convert the zinc to the chloro-complex ions for adsorption on the anion-exchange resin. However, it has been found that the zinc can be completely adsorbed on the anion-exchange resin even in the presence of a remarkably low concentration of chloride ions when phosphoric acid is included at a concentration of 20 to 60 wt.% as $P_2O_5$. The inventors have found that satisfactory adsorption of the zinc component could be attained in the concentration range of 20 to 60 wt.% as $P_2O_5$ of phosphoric acid and 10 to 40 g/liter as Cl of chloride ion. When the chloride ion concentration is more than 40 g/liter especially more than 70 g/liter as Cl, substantial adsorption of the zinc component does not take place. Even though the phosphoric acid containing zinc has a phosphoric acid concentration and chloride ion concentration in the above-mentioned range, when the zinc content is varied, the amount of the anion-exchange resin, the contacting conditions and the control of the operation have to be varied depending upon the zinc content, whereby it is difficult to completely remove the zinc in industrial practice. Accordingly, it is necessary to maintain a substantially constant zinc content in the phosphoric acid treated in the operation for removing the zinc by the anion-exchange resin. This fact has been also found by the inventors.

The inventors further researched a process for producing purified phosphoric acid which is suitable for industrial uses and food additive uses by extracting and purifying wet process phosphoric acid in the presence of hydrochloric acid to obtain a phosphoric acid which contains substantial amounts of zinc but does not substantially contain the other impurities (hereinafter referred to as extracted phosphoric acid) and then, removing the zinc component from the extracted phosphoric acid by an anion-exchange resin.

As a result, it has been found that under extraction conditions yielding less than a certain hydrochloric acid concentration in the extracted phosphoric acid, the zinc content in the extracted phosphoric acid has varied widely or the desired phosphoric acid extraction efficiency has not been obtained or the desired purity of phosphoric acid has not been obtained or scale has been formed in the extractor whereby there has been no success in obtaining extracted phosphoric acid which contains a constant zinc concentration and is substantially free from other impurities at a high phosphoric acid extraction efficiency.

The inventors have discovered the problems to be overcome by novel consideration and have further found that the partition coefficient of chloride ions in the extraction system varies depending upon the impurities and the phosphoric acid concentration and accordingly, the chloride ion concentration in the entire extraction system is highly variable in the conventional process and the partition coefficient of zinc is highly dependent upon the variation of the chloride ion concentration and accordingly, the movement of zinc is so complicated that a large amount of zinc accumulates in the extraction system, and the phenomenon of zinc accumulation in the extraction system is the main cause of the trouble. The present invention has been attained as a result of this finding.

SUMMARY OF THE INVENTION

It is an object of the present invention to provide a process for producing phosphoric acid having high purity which is suitable for industrial uses and food additive uses from wet process phosphoric acid in high yield by extracting and purifying wet process phosphoric acid with an organic solvent to obtain an extracted phosphoric acid which contains a substantial amount of the zinc component but does not substantially contain the other impurities and then, removing the zinc from the extracted phosphoric acid the an anion-exchange resin.

The foregoing and other objects of the present invention have been attained by a purification of the wet process phosphoric acid which comprises (a) a step of contacting the wet process phosphoric acid prepared by treating phosphate rock with sulfuric acid and a phosphoric acid solution containing impurities obtained in a scrubbing section with an organic solvent in the presence of the hydrochloric acid needed for extracting a substantial amount of the phosphoric acid component (hereinafter referring to as the acid extraction section);

(b) a step of contacting the phosphoric acid-organic solvent phase obtained in the acid extraction section (hereinafter referred to as the extract) with aqueous phosphoric acid or water while maintaining the chloride ion concentration in the aqueous phase in the range of 20 to 40 g/liter as Cl (hereinafter referred to as the scrubbing section);

(c) a step of contacting the phosphoric acid-organic solvent phase obtained in the scrubbing section (hereinafter referred to as purified extract) with water (hereinafter referred to as the acid stripping section) and (d) a step of contacting the extracted phosphoric acid obtained in the acid stripping section with an anion-exchange resin (hereinafter referred to as the adsorbing section).

DETAILED DESCRIPTION OF THE PREFERRED EMBODIMENT

The phosphoric acid component is extracted from wet process phosphoric acid with an organic solvent in the presence of enough hydrochloric acid to extract a substantial amount of the phosphoric acid component in the acid extraction section in the present invention. The amount of hydrochloric acid needed for extracting a substantial amount of the phosphoric acid component depends upon the kind and quality of phosphate rock, the production of the wet process phosphoric acid, the phosphoric acid concentration, the pretreatment, the extraction stages, the kind of solvent, the method of addition of hydrochloric acid etc. In the method of adding hydrochloric acid to the organic solvent, the purpose can be attained by the addition of 5 to 20 wt.% of hydrochloric acid as HCl to the wet process phosphoric acid fed to the acid extracting section. While the substantial amount of the phosphoric acid component is extracted into the organic solvent phase in the presence of hydrochloric acid, the total amount of the zinc component fed to the acid extracting section is also extracted into the organic solvent phase. Hence, it is impossible to separate the zinc from the phosphoric acid in the acid extraction section, because the partition coefficient of the zinc is substantially the same as the partition coefficient of phosphoric acid in the extraction system at the hydrochloric acid concentration needed for the purpose.

In the process of the present invention, substantial amounts of the phosphoric acid and the zinc fed to the acid extraction section are included in the extract obtained from the acid extraction section. The extract is contacted with aqueous phosphoric acid or water to remove impurities included in the extract besides the zinc component. It is important for the present invention to maintain the chloride ion concentration in the aqueous phase higher than 20 g/liter as Cl in the scrubbing section.

The phosphoric acid solution containing impurities discharged from the scrubbing section is recycled to the acid extracting section to recover the phosphoric acid component. Since most of the zinc component in the extract is moved to the aqueous phase in the scrubbing section, the zinc moved to the aqueous phase is again extracted into the organic solvent phase in the acid extracting section whereby the zinc is recycled through the acid extracting section and the scrubbing section so as to be concentrated and accumulated. This accumulation of zinc makes it difficult to obtain extracted phosphoric acid containing a constant quantity of zinc because the accumulated zinc is moved at once by slight variation of the chloride ion concentration to the extracted phosphoric acid or the amount of the zinc component moved to the extracted phosphoric acid is decreased depending upon the concentration of the accumulated zinc. Moreover, when the concentration of the accumulated zinc is increased, an adverse effect is caused in the extraction of phosphoric acid and it is difficult to maintain the normal conditions for the extraction. Accordingly, it is necessary to prevent the phenomenon of accumulation of the zinc component in the acid extracting section and the scrubbing section by minimizing the movement of zinc to the aqueous phase in the scrubbing section. For this purpose, it is important to maintain the chloride ion concentration in the aqueous phase higher than 20 g/liter as Cl in the scrubbing section. The inventors have found that the purpose can be attained by the control of chloride ion concentration.

The amount of aqueous phosphoric acid or water used in the scrubbing section is in the range of 0.01 to 0.5 (by volume) preferably 0.1 to 0.3 (by volume) of the extracted phosphoric acid. When the amount of the aqueous phosphoric acid or water is smaller, the extracted phosphoric acid can not be purified to the desired purity. When it is increased, the amount of phosphoric acid component recycled from the scrubbing section to the acid extracting section is increased whereby the size of the apparatus per given amount of product is increased and the phosphoric acid extraction efficiency is lowered. When the chloride ion concentration in the aqueous phase is maintained at higher than 20 g/liter as Cl in the scrubbing section, the zinc component is easily maintained in the organic solvent phase in comparison with the lower range of the chloride ion concentration whereby the movement of the zinc component to the water phase in the scrubbing section can be controlled even though the amount of the aqueous phosphoric acid or water in the above-mentioned range is contacted.

It is also important to maintain the chloride ion concentration in the water phase lower than 40 g/liter as Cl in the scrubbing section. When the chloride ion concentration in the aqueous phase is maintained higher than 20 g/liter as Cl in the scrubbing section, the phenomenon of accumulation of zinc can be prevented. However, when it is higher than 40 g/liter as Cl, the purification efficiency for removing the other metal components such as iron, aluminum, sodium, calcium, magnesium and titanium is remarkably lowered in the scrubbing section whereby it is difficult to obtain phosphoric acid having the desired purity. When a large amount of aqueous phosphoric acid or water is used in the scrubbing section, the purity of the extract phosphoric acid is improved. However, the size of the apparatus has to be increased and the phosphoric acid extraction efficiency is lowered disadvantageously.

In the process of the present invention, it is preferable to use aqueous phosphoric acid containing a suitable amount of zinc in the scrubbing section so as to minimize the amount of zinc moved. The zinc content depends upon the amount of the aqueous phosphoric acid, the chloride ion concentration, the kind of the solvent etc. The zinc content can be the amount which produces substantially no movement of zinc in the scrubbing section so as to prevent accumulation of zinc in the acid extracting section or the scrubbing section. The aqueous phosphoric acid containing zinc can be prepared by dissolving a zinc compound such as zinc chloride in purified phosphoric acid. In the optimum case, a part of the extracted phosphoric acid obtained in the process of the present invention can be recycled to the scrubbing section with or without control of the zinc concentration. In the latter process, the zinc component is not substantially added from the other source except from the wet process phosphoric acid to the extraction system or a little, whereby the degree of removal by the anion-exchange resin in the adsorbing section can be decreased.

The method of maintaining the chloride ion concentration in the scrubbing section is not critical and can be any desired method. It is usual to add hydrochloric acid etc., to the scrubbing section or to remove hydrochloric acid.

The system for contacting the wet process phosphoric acid with the organic solvent in the extracting system can be a batch system or a continuous system and preferably a continuous counter-current multi-stage extraction.

Suitable organic solvents include alcohols, ethers, ketones and phosphoric acid esters as described above. It is especially preferable to use n-butanol, isoamyl alcohol etc.

In accordance with the present invention, the extracted phosphoric acid obtained by the solvent extraction process has a phosphoric acid concentration of 10 to 50 wt.% especially 20 to 40 wt.% as $P_2O_5$ and a chloride ion concentration of 10 to 60 g/liter especially 20 to 40 g/liter as Cl. Accordingly, a substantial amount of the zinc component contained in the extracted phosphoric acid can be removed by contacting it with the anion-exchange resin without treating it. In this case, no loss of phosphoric acid is found, accordingly this method is remarkably economical. It is also possible to employ a section for recovering the organic solvent dissolved in the extracted phosphoric acid, a concentrating section and a section for controlling the chloride ion concentration before contacting it with the anion-exchange resin.

The anion-exchange resins can be strongly basic, basic or weakly basic anion-exchange resins, such as Dowex-1, Dowex-2 and Dowex-3 (manufactured by The Dow Chemical Co.), Amberlite IR-45, Amberlite IRA-400, Amberlite IRA-401 and Amberlite IRA-900 (manufactured by Rohm & Haas Co.) and Diaion A. Diaion SA#100 and Diaion SA#200 (manufactured by Mitsubishi Chemical Ind.) which can be Cl type, $H_2PO_4$ type or OH type.

The system for contacting with the anion-exchange resin can be a batch system or a continuous system. It is optimum to use a column filled with the anion-exchange resin.

The zinc component adsorbed on the anion-exchange resin can be easily desorbed by washing it with water. Accordingly, the anion-exchange resin can be reused after washing it with water and modifying it to the desired type.

In accordance with the process of the present invention, it is possible to obtain phosphoric acid having high purity in high yield of more than 98 wt.%, at least 96 wt.% to phosphoric acid content in the wet process phosphoric acid and it is possible to overcome various disadvantages caused by zinc in the acid extracting section so as to give easy operation. The process of the invention is the purification of the wet process phosphoric acid which can be practically employed in an industrial operation.

When a heavy metal such as cadmium or antimony is contained in the wet process phosphoric acid, the heavy metal component behaves substantially the same as the zinc component in the acid extracting section. However, the heavy metal can be also substantially removed by the anion-exchange resin at the same time.

The present invention will be further illustrated by certain examples whereby the terms "%", "ppm" and "part" means "% by weight, ppm by weight and part by weight."

EXAMPLE 1

In an extraction system comprising an acid extracting section, a scrubbing section and an acid stripping section, the extraction of phosphoric acid was carried out by feeding 1 part of wet process phosphoric acid containing the following impurities and a phosphoric acid solution discharged from the scrubbing section to the 20th mixer-settler of the acid extracting section and feeding 0.2 part of 35% HCl and 4.5 parts of n-butanol saturated with water to the first mixer-settler. The extract obtained from the acid extracting section was contacted with 0.6 part of aqueous phosphoric acid prepared by mixing purified phosphoric acid, water and 35% HCl at ratios of 1:1.46:0.14 by weight in the twentieth counter-current mixer-settler. Moreover, 35% HCl was added to the extract so as to provide a of chloride ion concentration in the aqueous phase of the scrubbing section of 25 to 35 g/liter as Cl. The purified extract obtained in the scrubbing section was contacted with 1.5 parts of pure water and all of the resulting n-butanol saturated with water was recycled to the acid extracting section.

In the normal condition, the zinc concentration in the extract was 43 ppm as Zn and the accumulation of zinc was not observed. The extracted phosphoric acid contained 20.1% of $P_2O_5$ and 28 g/liter of Cl and 120 ppm of Zn which was substantially constant. The extracted phosphoric acid was distilled to remove n-butanol and the phosphoric acid containing no n-butanol was passed through a column of polystyrene type quaternary ammonium type strong basic anion-exchange resin (ion-exchange capacity of 0.8 mg equivalent/ml. resin)-(manufactured by Rohm and Haas Co. Amberlite IRA-401) at a space velocity of 0.2 hr$^{-1}$, and then, it was concentrated to remove hydrochloric acid and to obtain the purified phosphoric acid (61.5% of $P_2O_5$) having the following components. The yield of the purified phosphoric acid was 98.3% and the ion-exchange resin had a total $P_2O_5$ treating capacity of 35 ton/m$^3$ wet resin.

|  | Wet process phosphoric acid | Purified phosphoric acid |
|---|---|---|
| $P_2O_5$ | 33% | 61.5% |
| Zn | 200 ppm | <0.2 ppm |
| Cd | 8 ppm | <0.01 ppm |
| Sb | 2 ppm | <0.01 ppm |
| Ca | 5,200 ppm | 3 ppm |
| Fe | 1,600 ppm | 2 ppm |
| Al | 2,500 ppm | 3 ppm |

EXAMPLE 2

The process of Example 1 was repeated except using 0.4 part of water instead of 0.6 part of the phosphoric acid solution in the scrubbing section. As the result, the purity, yield of the purified phosphoric acid and the treating ability of the ion-exchange resin were substantially the same as those of Example 1.

REFERENCE 1

The process of Example 1 was repeated except adding 35% HCl to the aqueous phosphoric acid used in the scrubbing section and to the extract so as to provide a chloride ion concentration in the aqueous phase of the scrubbing section of 10 to 15 g/liter as Cl. As the result, normal normal conditions, the zinc concentration in the extract was 800 ppm and Zn accumulation was observed. The Zn content in the extracted phosphoric acid varied remarkably from 10 to 300 ppm whereby the $P_2O_5$ treating capacity of the anion-exchange resin column was lowered to 10 ton/m$^3$ wet resin in comparison with that of Example 1 and the yield of the purified phosphoric acid was 95.5%.

EXAMPLE 3 AND REFERENCE 2

The process of Example 1 was repeated except using 9 parts of isoamyl alcohol saturated with water as the organic solvent per 1 part of the wet process phosphoric acid and using extracted phosphoric acid obtained in acid stripping section as the aqueous phosphoric acid used in the scrubbing section. As the result, accumulation of zinc in the extract system was not observed and extracted phosphoric acid having a constant zinc content was obtained.

Isoamyl alcohol was removed from the extracted phosphoric acid to obtain phosphoric acid containing 30% of $P_2O_5$, 35 g/liter of Cl and 185 ppm of Zn. The phosphoric acid was treated by passing it through the anion-exchange resin column to obtain purified phosphoric acid having the following components. The yield of the purified phosphoric acid was 98.1% and the ion-exchange resin had a total $P_2O_5$ treating capacity of 41 ton/m$^3$ wet resin.

As a control, the above-mentioned process was repeated except controlling the addition of 35% HCl so as to give 50 to 55 g/liter as Cl of chloride ion in the aqueous phase of the scrubbing section. The results are shown in the following table.

The yield of phosphoric acid and the treating capacity of the anion-exchange resin were substantially the same as those of the former process.

|  | Wet process phosphoric acid | Purified phosphoric acid | |
|---|---|---|---|
|  |  | Example 3 | Reference 2 |
| $P_2O_5$ | 45% | 61.5% | 61.5% |
| Zn | 280 ppm | <0.1 ppm | <0.1 ppm |
| Ca | 4,500 ppm | 3 ppm | 25 ppm |
| Fe | 1,800 ppm | 2 ppm | 73 ppm |
| Al | 3,000 ppm | 3 ppm | 37 ppm |
| Ti | 200 ppm | 1 ppm | 15 ppm |

What is claimed is:

1. In a process for producing high purity phosphoric acid from wet process phosphoric acid by extracting said wet process phosphoric acid with a partially miscible organic solvent, the improvement which comprises:
   a. extracting said wet process phosphoric acid by admixing therewith said organic solvent and from 5 to 20 wt.% HCl based on said wet process phosphoric acid to obtain an extract;
   b. contacting said extract with an aqueous medium comprising water or aqueous phosphoric acid and maintaining the chloride ion concentration of said aqueous medium at from 20 to 40 g/l as Cl to obtain a purified extract having a zinc concentration which remains substantially constant, whereby iron, aluminum, sodium, calcium, magnesium, and titanium components are preferentially concentrated in the aqueous phase;

c. contacting said purified extract with water to obtain aqueous phosphoric acid; and d. contacting said aqueous phosphoric acid with an anion exchange resin to remove zinc ions therefrom.

2. The process of claim 1 wherein a portion of the aqueous phosphoric acid obtained by contacting said purified extract with water is used as the aqueous phosphoric acid contacted with the extract.

3. The process of claim 1 wherein the partially miscible organic solvent is n-butyl alcohol or isoamyl alcohol.

4. The process of claim 1, wherein the aqueous phosphoric acid contacted with the anion exchange resin has a chloride content of 10 to 40 g/l and a phosphoric acid concentration as $P_2O_5$ of from 20 to 60 wt.%.

* * * * *